(12) United States Patent
Yui

(10) Patent No.: US 7,545,071 B2
(45) Date of Patent: Jun. 9, 2009

(54) BRUSH HOLDER DEVICE FOR USE IN SMALL-SIZE MOTOR

(75) Inventor: Toshiya Yui, Matsudo (JP)

(73) Assignee: Mabuchi Motor Co., Ltd., Chiba (JP)

( * ) Notice: Subject to any disclaimer, the term of this patent is extended or adjusted under 35 U.S.C. 154(b) by 1502 days.

(21) Appl. No.: 10/055,457

(22) Filed: Jan. 23, 2002

(65) Prior Publication Data

US 2002/0135261 A1 Sep. 26, 2002

(30) Foreign Application Priority Data

Feb. 6, 2001 (JP) .............................. 2001-029124

(51) Int. Cl.
*H02K 13/00* (2006.01)
*H01R 39/38* (2006.01)

(52) U.S. Cl. .................... 310/239; 310/242; 310/244; 310/246; 310/249

(58) Field of Classification Search ................ 310/239, 310/242, 244, 246, 249
See application file for complete search history.

(56) References Cited

U.S. PATENT DOCUMENTS

| | | | | |
|---|---|---|---|---|
| 4,085,346 A | * | 4/1978 | Yoshida | 310/246 |
| 4,088,912 A | * | 5/1978 | Yoshida | 310/244 |
| 4,157,483 A | * | 6/1979 | Frimley | 310/242 |
| 4,238,703 A | * | 12/1980 | Yoshida | 310/242 |
| 4,431,933 A | * | 2/1984 | Mabuchi | 310/239 |
| 4,574,215 A | * | 3/1986 | Mabuchi | 310/239 |
| 4,746,829 A | * | 5/1988 | Strobl | 310/239 |
| 5,103,131 A | * | 4/1992 | Sekine | 310/239 |

FOREIGN PATENT DOCUMENTS

| | | | |
|---|---|---|---|
| JP | 51-13503 | | 1/1976 |
| JP | 58058848 A | * | 4/1983 |
| JP | 63-66054 | | 5/1988 |
| JP | 11-252869 | | 9/1999 |

* cited by examiner

*Primary Examiner*—Quyen P Leung
*Assistant Examiner*—Alex W Mok
(74) *Attorney, Agent, or Firm*—McGlew and Tuttle, P.C.

(57) ABSTRACT

A brush holder device includes a brush including an integrally formed engagement portion; a brush arm having an engagement hole formed therein, the engagement hole assuming substantially the same shape as that of the engagement portion of the brush, and including brush contact portions located at laterally opposite edges of the engagement hole; and a holder. The holder has an engagement hole formed therein, the engagement hole assuming substantially the same shape as that of the engagement portion of the brush, and is fixedly attached to the brush arm such that the engagement hole is aligned with that of the brush arm. The engagement portion of the brush is press-fitted into the engagement holes of the holder and the brush arm, which are fixedly attached to each other, to thereby be fixed in place.

12 Claims, 4 Drawing Sheets

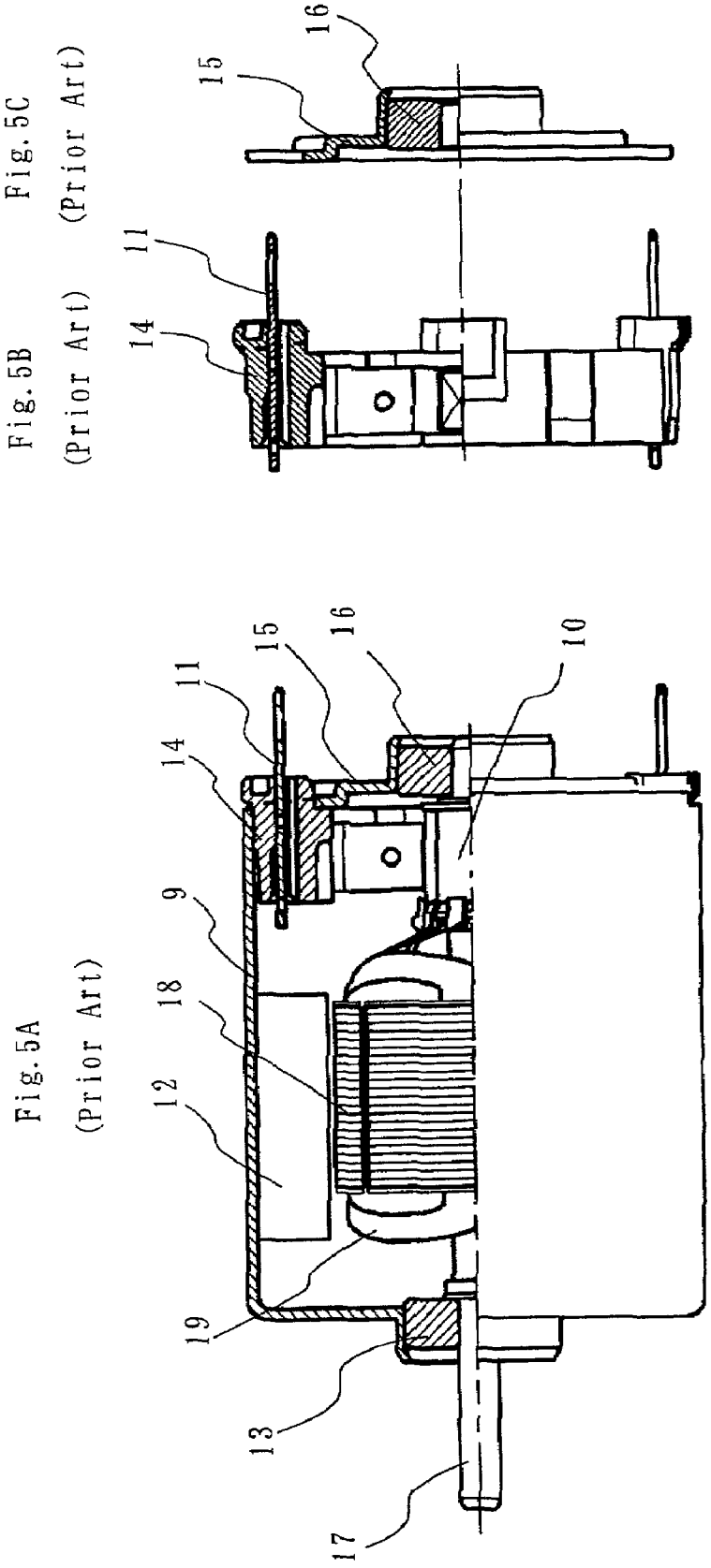

Heat Radiation Effect Achieved by Conventional Technique

Heat Radiation Effect Achieved by The Present Invention

BRUSH HOLDER DEVICE FOR USE IN SMALL-SIZE MOTOR

BACKGROUND OF THE INVENTION

1. Field of the Invention

The present invention relates to a brush holder device for use in a small-size motor used for driving, for example, a power tool.

2. Description of the Related Art

The brush holder device of the present invention can be used in ordinary small-size motors. An example of such a small-size motor is described below with reference to FIG. 5.

FIG. 5A is a half sectional view showing a small-size motor of conventional configuration; FIG. 5B is a half sectional view showing an end bell of synthetic resin when removed from a housing of the motor of FIG. 5A; and FIG. 5C is a half sectional view showing an end cover for the housing of the motor of FIG. 5A. A housing 9 is formed from a metallic material into a closed-end hollow cylindrical shape and has a magnet 12 mounted on the inner wall thereof. An end cover 15 is fitted to an end opening portion of the housing 9 to thereby close the housing 9. A bearing 16 for supporting one end of a shaft 17 is housed in a central portion of the end cover 15. An opposite end of the shaft 17 is supported by a bearing 13 provided at the center of a closed-end portion of the housing 9.

The shaft 17 carries a laminated core 18, windings 19 wound onto the laminated core 18, and a commutator 10, thus forming a rotor of the small-size motor. Brushes in contact with the commutator 10 are connected to brush arms. Input terminals 11 connected to the brush arms extend through the end cover 15 and project outward from the end cover 15 for electric connection.

As described above, a brush holder device of the small-size motor is composed of a brush, and a brush arm for supporting the brush. The brush arm is mechanically and electrically connected to an input terminal supported by an end bell 14. Such a conventional brush holding technique will next be described with reference to FIGS. 3 and 4.

FIG. 3 shows a state of a brush being mounted on a brush arm according to a conventional technique, wherein FIG. 3A is a view of the brush as viewed from a side opposite a side for contact with a commutator, and FIG. 3B is a side view. FIG. 4 shows components of the configuration of FIG. 3 in an exploded condition, wherein FIG. 4A shows a tip portion of the brush arm, and FIG. 4B shows a brush.

An end of a brush 7 that is opposite an end for contact with a commutator is attached to a brush arm 1. In order to enhance longitudinal rigidity, the brush arm 1 is bent along laterally opposite edges (see FIG. 4A). In order to allow attachment of the brush 7 to its tip portion, the brush arm 1 has an engagement hole formed in the tip portion such that the engagement hole assumes the same shape as that of an engagement portion of the brush 7 so as to receive the brush 7 and such that laterally opposite edge portions of the engagement hole are bent to form brush contact portions 4. Notably, a portion of the brush arm 1 other than the tip portion is not illustrated. When the brush 7 is fitted into the engagement hole of the brush arm 1, the brush contact portions 4 support the brush 7 while maintaining mechanical and electrical contact with the brush 7.

As shown in FIG. 3, the brush 7 attached to the brush arm 1 undergoes bonding by use of an electrically conductive adhesive 8; for example, an epoxy adhesive mixed with silver. Thus is completed assembly of the brush holder device.

However, the brush holder device involves high cost in assembly, since the electrically conductive adhesive 8 is expensive. Additionally, use of the electrically conductive adhesive 8 impairs work efficiency, since, for example, the adhesive 8 requires drying. Particularly, in view of the brush arm 1 serving not only as a current path to the brush 7 but also as a heat radiator for releasing heat generated from sliding contact between the brush 7 and a commutator, a thicker brush arm 1 is advantageous. However, the thickness of the brush arm 1 is limited, since the brush arm 1 must cause the brush 7 to be in contact with the rotating commutator at constant brush tension while absorbing vibration induced by the brush 7 being in contact with the surface of the commutator, which is not smooth due to gaps between commutator segments. As a result, the conventional brush arm 1 fails to exhibit sufficient heat radiation effect.

SUMMARY OF THE INVENTION

An object of the present invention is to solve the above-mentioned problems and to provide a brush holder device for use in a small-size motor, allowing use of inexpensive members to thereby reduce manufacturing cost and exhibiting enhanced heat radiation effect for releasing heat generated in a brush.

Another object of the present invention is to provide a brush holder device for use in a small-size motor in which a brush arm supports a brush while reliably maintaining mechanical, electrical, and thermal contact with the brush.

A brush holder device for use in a small-size motor of the present invention includes a brush arm connected at one end to an input terminal for external electrical connection and supporting at an opposite end a brush. The brush holder device comprises a brush including an integrally formed engagement portion; a brush arm having an engagement hole formed therein, the engagement hole assuming substantially the same shape as that of the engagement portion of the brush, and including brush contact portions located at laterally opposite edges of the engagement hole; and a holder. The holder has an engagement hole formed therein, the engagement hole assuming substantially the same shape as that of the engagement portion of the brush, and is fixedly attached to the brush arm such that the engagement hole is aligned with that of the brush arm. The engagement portion of the brush is press-fitted into the engagement holes of the holder and the brush arm, which are fixedly attached to each other, to thereby be fixed in place.

Brush contact portions may be formed on the holder through bending along longitudinally opposite edges of the engagement hole of the holder. Further, the holder may include fins formed through bending along longitudinally opposite ends thereof.

BRIEF DESCRIPTION OF THE DRAWINGS

FIG. 5A is a half sectional view showing an example ordinary small-size motor in which the brush holder device of the present invention can be used;

FIG. 5B is a half sectional view showing an end bell of synthetic resin when removed from a housing of the motor of FIG. 5A;

FIG. 5C is a half sectional view showing an end cover for a housing of the motor of FIG. 5A;

DETAILED DESCRIPTION OF THE PREFERRED EMBODIMENT

A brush holder device for use in a small-size motor of the present invention includes a brush, and a brush arm for supporting the brush, which brush arm is mechanically and electrically connected, through known means such as crimping, to an input terminal supported by an end bell. Since the present invention is similar to the conventional technique described previously except for a manner in which the brush is supported by the brush arm, the following description merely encompasses a brush holding configuration.

Figure 1:
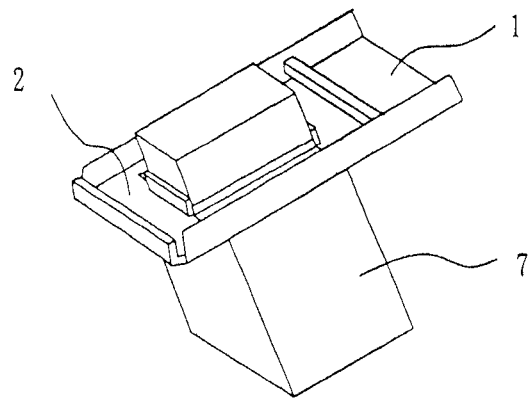
FIG. 1 is a perspective view of a brush holder device of the present invention, merely showing a brush attachment portion of a brush arm, with a portion connected to an input terminal being omitted.
Figure 2A:
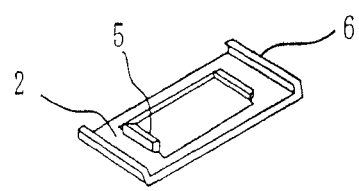
FIG. 2A is a perspective view of a holder of the brush holder device of FIG. 1.
Figure 2B:
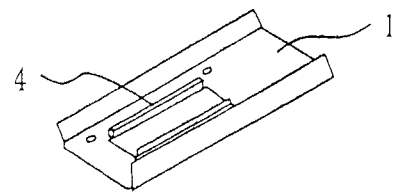
FIG. 2B is a perspective view of the brush arm of the brush holder device of FIG. 1 with a portion of the brush arm connected to an input terminal being omitted.

FIG. 1 perspectively shows the brush holder device of the present invention in such a manner as to show a brush attachment portion of a brush arm, with a portion connected to an input terminal being omitted. FIG. 2A perspectively shows a holder of the brush holder device of FIG. 1; FIG. 2B perspectively shows the brush arm of the brush holder device of FIG. 1 with a portion of the brush arm connected to the input terminal being omitted; and FIG. 2C perspectively shows the brush of the brush holder device of FIG. 1.

Figure 2C:
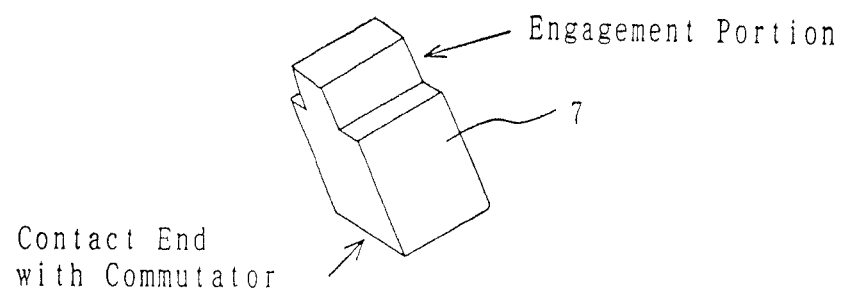
FIG. 2C is a perspective view of the brush of the brush holder device of FIG. 1.
Figure 3A:
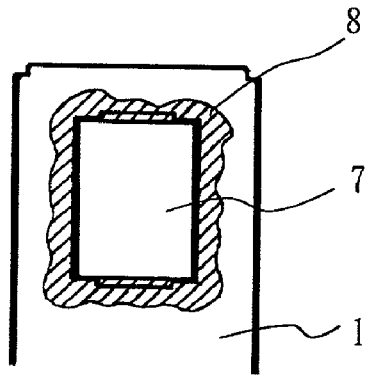
FIG. 3A is a front view showing a brush attachment portion of a conventional brush arm.
Figure 3B:
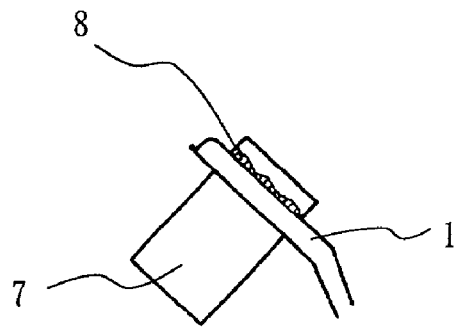
FIG. 3B is a side view of the portion of engagement of FIG. 3A.

The brush 7 itself can be made of a conventionally employed material (e.g., carbon) and can assume a conventionally employed shape. As shown in FIG. 2C, the brush 7 includes an engagement portion which assumes a stepped form and is formed at its end opposite its contact end with a commutator. In order to enhance rigidity along the longitudinal direction, the brush arm 1 is bent along laterally opposite edges thereof. The brush arm 1 has an engagement hole formed in its tip portion such that the engagement hole assumes the same shape as that of an engagement portion of the brush 7 so as to receive the brush 7 and such that laterally opposite edge portions of the engagement hole are bent to form brush contact portions 4. When the brush 7 is fitted into the engagement hole of the brush arm 1, the brush contact portions 4 not only mechanically support the brush 7 by means of elasticity thereof but also serve as a path of electric current flowing to the brush 7 through electrical contact with the brush 7. Of course, in operation as a component of the brush holder device, the brush arm 1 serves as a main electrical and thermal path while the back surface thereof is in contact with the shoulders of the stepped engagement portion of the brush 7. Thus, the brush arm 1 can be configured in a similar manner as is the previously described conventional brush arm.

According to the present invention, the brush 7 is not directly attached to the thus-configured brush arm 1; i.e., first, a holder 2 shown in FIG. 2A is attached to the brush arm 1. In order to assume predetermined spring properties for imparting predetermined tension to the brush 7, the brush arm 1 itself is made of a rather expensive material, such as beryllium copper. By contrast, since the holder 2 does not need to assume intensive spring properties, the holder 2 can be made of, for example, phosphor bronze, which is an inexpensive material. An input terminal can be made of, for example, brass.

As shown in FIG. 2A, the holder 2 has an engagement hole formed in a substantially central portion thereof so as to receive an engagement portion of the brush 7. The engagement hole is substantially equal in size to that formed in the brush arm 1; however, strictly speaking, the engagement hole has such a size as to allow press fit of the brush contact portions 4 of the brush arm 1 in addition to the engagement portion of the brush 7. In the holder 2, brush contact portions 5, which function similarly as do the brush contact portions 4 provided on the brush arm 1, can be formed through bending along longitudinally opposite edges of the engagement hole. Also, cooling fins 6 can be formed through bending along longitudinally opposite ends of the holder 2. Before attachment of the brush 7, the thus-configured holder 2 is fixedly attached to a tip portion of the brush arm 1 through, for example, crimping such that the engagement hole of the brush arm 1 is aligned that of the holder 2. Crimping is performed according to, for example, the following known method. A plurality of bosses (e.g., 4 bosses) are formed on the mounting surface of the holder 2, which surface rests on the brush arm 1, while corresponding boss holes are formed in the brush arm 1. The holder 2 and the brush arm 1 are joined together such that the bosses are fitted into the corresponding boss holes. Subsequently, boss tips are crushed through application of force thereto from behind the brush arm 1.

Next, the brush 7 is attached to the thus-joined unit of the holder 2 and the brush arm 1. As mentioned previously, since the holder 2 does not need to assume intensive spring properties, the holder 2 can be formed of a rather thick sheet to thereby impart rigidity thereto. For example, the brush arm 1 assume a thickness of not greater than 0.15 mm, whereas the holder 2 can assume a thickness of 0.3 mm. According to the present invention, the brush arm 1 is bent along laterally opposite edges thereof to thereby be enhanced in rigidity along the longitudinal direction. Further, the brush contact portion 5 and the cooling fins 6 provided on the holder 2 can function to enhance the rigidity of the completed brush holder device along the lateral direction.

As a result of the holder 2 being fixedly attached to the brush arm 1, the engagement hole is surrounded entirely by the brush contact portions 4 and 5. Additionally, the brush contact portions 5 of the holder 2 assume high rigidity. Thus, when the brush 7 is press-fitted into the engagement hole, the brush 7 is fixed rigidly in place by means of the elasticity of the brush contact portions 4 and 5. Not only does the holder 2 itself serve as a heat radiator, but also the holder 2 has the fins 6, which are formed through bending along longitudinally opposite ends thereof, thereby yielding high heat radiation effect.

Figure 4A:
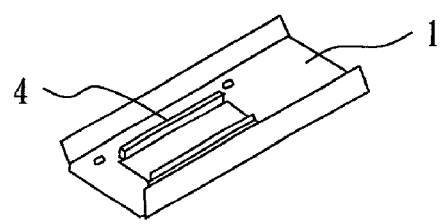
FIG. 4A is a perspective view of a tip portion of the brush arm of FIGS. 3A and 3B.
Figure 4B:
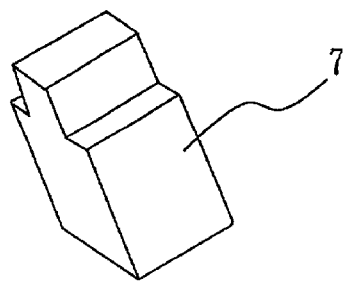
FIG. 4B is a perspective view of the brush of FIGS. 3A and 3B.
Figure 6:
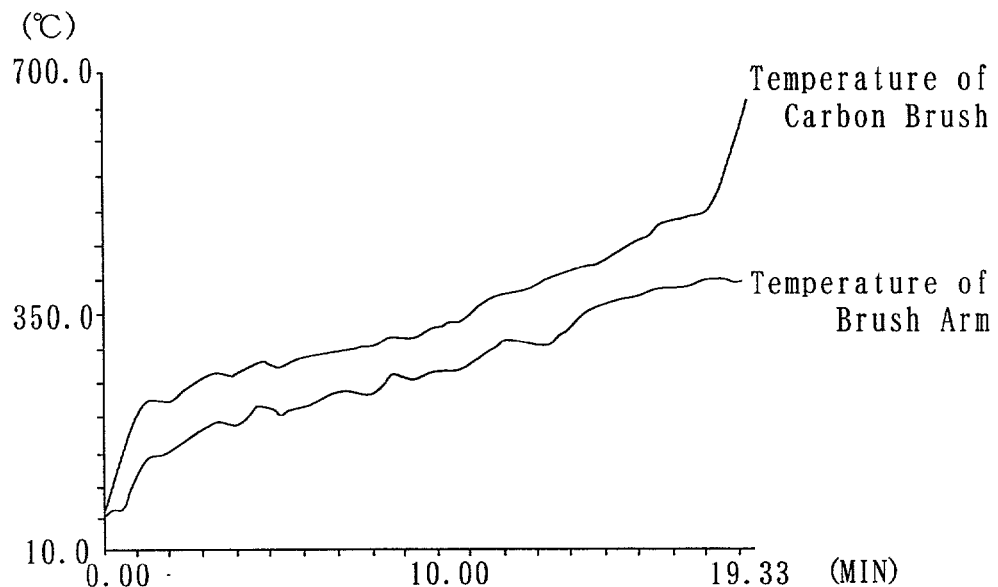
FIG. 6 is a graph showing heat radiation effect exhibited by a conventional brush holder device.
Figure 7:
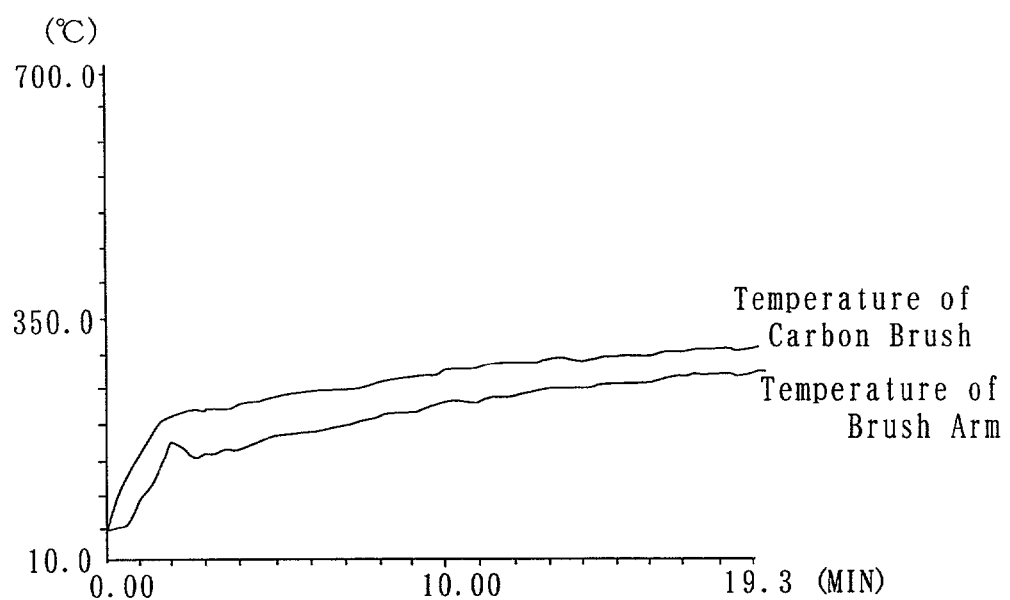
FIG. 7 is a graph showing heat radiation effect exhibited by the brush holder device of the present invention.

FIGS. 6 and 7 show heat radiation effects exhibited by the conventional technique and the present invention. The heat radiation effect shown in FIG. 6 is exhibited by the brush holder device shown in FIG. 4 and employing no electrically conductive adhesive. FIGS. 6 and 7 show a change with time in the temperature of a carbon brush as measured at a far end of the brush (at an end opposite a contact end with a commutator) and in the temperature of a brush arm as measured at a tip portion of the brush arm. As seen from FIGS. 6 and 7, not only is the conventional technique higher in temperature itself than the present invention, but also the conventional technique is steeper in temperature rise with time than the present invention. That is, the present invention exhibits better heat radiation effect than does the conventional technique.

The table below compares durability among a conventional brush holder device employing electrically conductive adhesive, a conventional brush holder device employing no electrically conductive adhesive, and a brush holder device of the present invention. Three or five respective brush holder device samples were incorporated into small-size motors of the same configuration. The samples were compared in life as measured until the brush attachment portion of a brush arm suffers any fault, such as cracking. The life is represented by the number of cycles, each cycle consisting of one-second operation of motor and 19-second halt.

TABLE 1

Results of Life Test on Brush Attachment Portion

| Sample No. | 1 | 2 | 3 | 4 | 5 | Average |
|---|---|---|---|---|---|---|
| Conventional technique (electrically conductive adhesive not employed) | 364 | 375 | 374 | | | 371 |
| Conventional technique (electrically conductive adhesive employed) | 732 | 990 | 594 | 666 | 630 | 722 |
| Present invention | 707 | 873 | 909 | 630 | 981 | 820 |

As shown in Table 1, the present invention can provide a brush holder device of lengthened life for the following reason. As a result of a rigid holder being fixedly attached to an elastic brush arm, strength is enhanced, thereby preventing torsion of a brush-holding portion of the brush arm.

According to the configuration of the present invention, a holder is fixedly attached to a brush arm, and an engagement portion of a brush is press-fitted into engagement holes of the united holder and brush arm, thereby allowing use of inexpensive members to thereby reduce manufacturing cost and exhibiting enhanced heat radiation effect for releasing heat generated in the brush.

The present invention enables a brush arm to support a brush while reliably maintaining mechanical, electrical, and thermal contact with the brush.

What is claimed is:

1. A brush holder device for use in a small-size motor including a brush arm connected at one end to an input terminal for external electrical connection and supporting at an opposite end a brush, comprising:
   a brush including an integrally formed engagement portion;
   a brush arm having an engagement hole formed therein, the engagement hole assuming substantially the same shape as that of the engagement portion of said brush, and including brush arm brush contact portions located at laterally opposite edges of the engagement hole; and
   a holder having an engagement hole formed therein and holder brush contact portions formed via bending, said holder being made of a material having lower spring properties than said brush arm, the engagement hole assuming substantially the same shape as that of the engagement portion of said brush, said holder being fixed to said brush arm such that the engagement hole of said holder is aligned with the engagement hole of said brush arm, said brush arm brush contact portions extending through said engagement hole of said holder, whereby one of said brush arm brush contact portions is adjacent to one of said holder brush contact portions;
   wherein said holder brush contact portions are formed on said holder along opposite edges defining said engagement hole of said holder, one edge of said holder being opposite another edge of said holder in a longitudinal direction of said brush arm, said engagement portion of said brush being press-fitted into the engagement holes of said holder and said brush arm, whereby said engagement portion of said bush is fixed to said holder and said brush arm via said holder brush contact portions and said brush arm brush contact portions.

2. A brush holder device for use in a small-size motor according to claim 1, wherein said holder includes fins formed through bending along opposite ends thereof, the ends being opposite in a longitudinal direction of said brush arm.

3. A brush holder device, comprising:
   a brush including an integrally formed engagement portion having a first side, a second side, a third side and a fourth side;
   a brush arm having a defined engagement hole, said engagement hole having substantially the same shape as that of said engagement portion of said brush, said brush arm including a first brush contact portion located at one edge defining said engagement hole and a second brush contact portion located at another edge defining said engagement hole, said first brush contact portion being opposite said second brush contact portion, said first brush contact portion and said second brush contact portion extending in a longitudinal direction of said brush arm; and
   a holder having a defined brush receiving hole, said brush receiving hole having substantially the same shape as that of the engagement portion of said brush, said holder including a third brush contact portion located at an edge defining said brush receiving hole and a fourth brush contact portion located at another edge defining said brush receiving hole, said third brush contact portion being opposite said fourth brush contact portion in a longitudinal direction of said brush arm, said holder being connected to said brush arm such that said engagement hole aligns with said brush receiving hole and said first brush contact portion and said second brush contact portion of said brush arm extends through said brush receiving hole, said engagement portion of said brush extending through said engagement hole and said brush receiving hole such that said first brush contact portion engages said first side of said brush, said second brush contact surface engages said second side of said brush, said third brush contact portion engages said third side of said brush and said fourth brush contact portion engages said fourth side of said brush, whereby said brush is connected to said holder and said brush arm.

4. A brush holder device according to claim 3, wherein said holder includes fins formed through bending along opposite ends thereof, the ends being opposite along a longitudinal direction of said brush arm.

5. A brush holder device according to claim 3, wherein said first brush contact portion and said second brush contact portion of said brush arm have a length corresponding to a longitudinal length of said brush receiving hole of said holder.

6. A brush holder device according to claim 5, wherein said holder is composed of a material having a first modulus of elasticity, said brush arm being composed of another material having a second modulus of elasticity, said first modulus of elasticity being greater than said second modulus of elasticity.

7. A brush holder device according to claim 3, wherein said holder is composed of a material having a first modulus of elasticity, said brush arm being composed of another material having a second modulus of elasticity, said first modulus of elasticity being greater than said second modulus of elasticity.

8. A brush holder device according to claim 3, wherein said holder has a thickness that is greater than a thickness of said brush arm.

9. A brush holder device, comprising:
  a brush including an integrally formed engagement portion;
  a first brush mounting element having a defined engagement hole, said engagement hole having substantially the same shape as that of said engagement portion of said brush, said first brush mounting element including a first brush contact portion located at one edge defining said engagement hole and a second brush contact portion located at another edge defining said engagement hole, said first brush contact portion being opposite said second brush contact portion; and
  a second brush mounting element having a defined brush receiving hole, said brush receiving hole having substantially the same shape as that of the engagement portion of said brush, said second brush mounting element including a third brush contact portion located at an edge defining said brush receiving hole and a fourth brush contact portion located at another edge defining said brush receiving hole, said third brush contact portion being opposite said fourth brush contact portion, said third brush contact portion and said fourth brush contact portion defining a longitudinal length of said brush receiving hole of said second brush mounting element, said first brush contact portion and said second brush contact portion of said first brush mounting element having a length corresponding to said longitudinal length of said brush receiving hole of said second brush mounting element, said first brush mounting element being connected to said second brush mounting element such that said engagement hole is in alignment with said brush receiving hole, said first brush contact portion and said second brush contact portion extending through said brush receiving hole, said engagement portion of said brush extending through said engagement hole and said brush receiving hole such that said first, second, third and fourth brush contact portions are in direct contact with said engagement portion, whereby said brush is connected to said holder and said brush arm via said first, second, third and fourth brush contact portions.

10. A brush holder device according to claim 9, wherein said holder includes fins formed through bending along opposite ends thereof, the ends being opposite along a longitudinal direction of said brush arm.

11. A brush holder device according to claim 9, wherein said first brush mounting element is composed of a material having a first modulus of elasticity, said second brush mounting being composed of another material having a second modulus of elasticity, said second modulus of elasticity being greater than first modulus of elasticity.

12. A brush holder device according to claim 9, wherein said second brush mounting element has a thickness that is greater than a thickness of said first brush mounting element.

* * * * *